United States Patent
Bingel et al.

(10) Patent No.: US 8,068,322 B2
(45) Date of Patent: Nov. 29, 2011

(54) ELECTRONIC CIRCUIT BREAKER APPARATUS AND SYSTEMS

(75) Inventors: Thomas Bingel, Indian Rocks Beach, FL (US); Deanne Tran-Vo, Palm Harbor, FL (US)

(73) Assignee: Honeywell International Inc., Morristown, NJ (US)

( * ) Notice: Subject to any disclaimer, the term of this patent is extended or adjusted under 35 U.S.C. 154(b) by 561 days.

(21) Appl. No.: 12/183,868

(22) Filed: Jul. 31, 2008

(65) Prior Publication Data

US 2010/0027180 A1    Feb. 4, 2010

(51) Int. Cl.
*H02H 3/08* (2006.01)

(52) U.S. Cl. ............ 361/93.1; 361/93.2; 361/93.3; 361/93.4; 361/93.5; 361/93.6; 361/93.7; 361/93.8; 361/93.9

(58) Field of Classification Search ......... 361/93.1–93.9
See application file for complete search history.

(56) References Cited

U.S. PATENT DOCUMENTS

| | | | |
|---|---|---|---|
| 4,360,851 A | 11/1982 | Zundel | |
| 4,394,703 A | 7/1983 | Butcher | |
| 4,493,002 A | 1/1985 | Pelowski et al. | |
| 4,528,608 A | 7/1985 | Andersson et al. | |
| 4,530,023 A | 7/1985 | Brown | |
| 4,652,975 A * | 3/1987 | Scott | 361/772 |
| 4,736,267 A | 4/1988 | Karlmann et al. | |
| 4,835,649 A | 5/1989 | Numata | |
| 4,845,584 A | 7/1989 | Numata | |
| 4,853,820 A | 8/1989 | Ham, Jr. et al. | |
| 4,979,068 A | 12/1990 | Sobhani et al. | |
| 5,469,002 A | 11/1995 | Garrett | |
| 5,563,759 A | 10/1996 | Nadd | |
| 5,896,260 A * | 4/1999 | Esposito | 361/79 |
| 6,429,631 B2 * | 8/2002 | Inaba et al. | 323/277 |
| 6,587,027 B1 | 7/2003 | Nadd | |
| 6,850,396 B1 | 2/2005 | Clemo et al. | |
| 7,230,813 B1 | 6/2007 | Canova et al. | |
| 7,339,773 B2 | 3/2008 | Gergintschew | |
| 2001/0023967 A1 * | 9/2001 | Yoneda | 257/393 |

FOREIGN PATENT DOCUMENTS

DE    3740138    *    6/1989

* cited by examiner

*Primary Examiner* — Rexford Barnie
*Assistant Examiner* — Tien Mai
(74) *Attorney, Agent, or Firm* — Ingrassia Fisher & Lorenz, P.C.

(57) ABSTRACT

Electronic circuit breakers and systems for isolating a load from a power-supply unit are provided. One electronic circuit breaker includes a current sensor, a switching element coupled to the current sensor, and a switch controller coupled to the current sensor and the switching element. The switch controller is powered by the power-supply unit and is configured to switch OFF the switching element when the current sensor detects an amount of current from the power-supply unit greater than a predetermined amount. An electronic system includes a power-supply unit, a load, and the above-referenced electronic circuit breaker coupled to the power-supply unit and the load.

12 Claims, 2 Drawing Sheets

_US 8,068,322 B2_

ELECTRONIC CIRCUIT BREAKER APPARATUS AND SYSTEMS

STATEMENT REGARDING FEDERALLY SPONSORED RESEARCH OR DEVELOPMENT

The United States Government has a paid-up license in this invention and the right in limited circumstances to require the patent owner to license others on reasonable terms as provided by the terms of contract No. NNM05AB50C awarded by the National Aeronautics and Space Administration (N.A.S.A.).

FIELD OF THE INVENTION

The present invention generally relates to electronic systems, and more particularly relates to electronic circuit breaker apparatus and systems for isolating a load from a power-supply unit.

BACKGROUND OF THE INVENTION

Over-current protection is an important safety feature in commercial electrical applications. In high-reliability applications (e.g., aerospace applications), fuses or mechanical circuit breakers are generally used for over-current fault isolation; however, both fuses and mechanical circuit breakers have respective shortcomings. For example, the nature of a fuse is such that fuses present a reliability risk during operation since they may be OFF at start-up and need to be replaced after the fuse is blown. Similarly, the nature of mechanical circuit breakers makes mechanical circuit breakers subject to vibration, and must be physically reset when tripped.

Accordingly, it is desirable to provide electronic circuit breaker apparatus and systems that are powered ON at start-up and can be electrically reset when tripped. It is further desirable to provide electronic circuit breaker apparatus and systems for use in high voltage and/or high-current applications. In addition, other desirable features and characteristics of the present invention will become apparent from the subsequent detailed description of the invention and the claims, taken in conjunction with the accompanying drawings and this background of the invention.

BRIEF SUMMARY OF THE INVENTION

Various embodiments provide an electronic circuit breaker configured to fault isolate a load from a power-supply unit. One electronic circuit breaker comprises a current sensor configured to be coupled to the power-supply unit and a first switching element coupled to the current sensor and configured to be coupled to the load. The electronic circuit breaker further comprises a switch controller coupled to the current sensor and the first switching element, and configured to be coupled to and receive power from the power-supply unit. In various embodiments, the switch controller is configured to switch OFF the first switching element when the current sensor detects an amount of current from the power-supply unit greater than a predetermined amount.

Electronic systems comprising a power-supply unit, a load, and an electronic circuit breaker coupled between the power-supply unit and the load are also provided. In one embodiment, the electronic circuit breaker comprises a current sensor coupled to the power-supply unit, a first switching element coupled to the current sensor and the load, and a switch controller coupled to the power-supply unit, the current sensor, and the first switching element. In this embodiment, the switch controller is powered by the power-supply unit and is configured to switch OFF the first switching element when the current sensor detects an amount of current from the power-supply unit greater than a predetermined amount.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Various embodiments of the invention provide electronic circuit breaker apparatus and systems that are powered ON at start-up. Furthermore, the electronic circuit breaker apparatus and systems can be electrically reset when tripped and are capable of being used in high-voltage and/or high-current applications.

Figure 1:
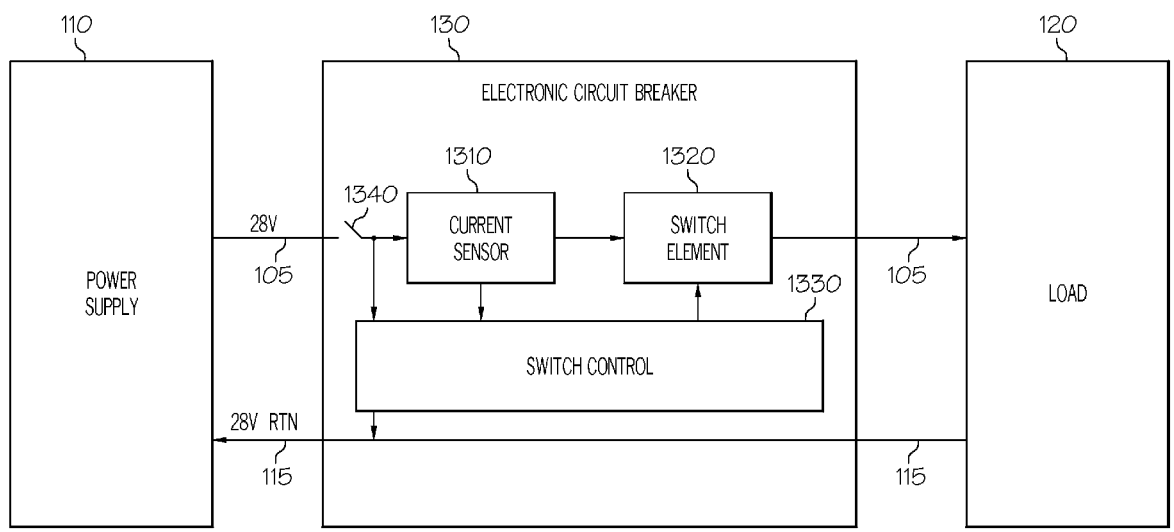
FIG. 1 is a block diagram of one embodiment of an electronic system comprising a power-supply unit, a load, and an electronic circuit breaker coupled between the power-supply unit and the load.

FIG. 1 is a block diagram of one embodiment of an electronic system 100 in accordance with various embodiments of the invention. At least in the illustrated embodiment, electronic system comprises a power-supply unit 110 coupled to a load 120 via a power rail 105 and a current return 115, and an electronic circuit breaker 130 coupled between power-supply unit 110 and load 120 on power rail 105 and current return 115.

Power-supply unit 110 may be any system and/or device capable of supplying power to load 120. Load 120 may be any electronic system and/or device that uses electric voltage or current to operate. In one embodiment, load 120 is a system/device utilizing a voltage in the range of about 1.0 mV to about 1.2 kV. In another embodiment, load 120 is a system/device that uses an amount of current in the range of about 1.0 mA to about 1.0 kA. In the embodiment illustrated in FIG. 1, power supply unit 110 is a 28 volt power supply and load 120 is a 28 volt load.

Electronic circuit breaker 130 comprises a current sensor 1310 coupled to a switching element 1320 and a switch controller 1330 that are also coupled to one another. Electronic circuit breaker 130 further comprises a switch 1340 that enables electronic circuit breaker 130 to be electronically or manually switched back ON after electronic circuit breaker 130 "trips." Current sensor 1310 is configured to detect the amount of current being supplied to load 120 from power supply unit 110.

Switching element 1320 is configured to isolate load 120 from power supply unit 110 when switching element 1320 is switched OFF and enable load 120 to receive power from power supply unit 110 when switching element 1320 is switched ON. The ON/OFF switching operation of switching element 1320 is controlled by switch controller 1330.

Switch controller 1330 is configured to receive the detected amount of current from current sensor 1310 and will command switching element 1320 OFF when the detected amount of current is greater than or equal to a predetermined amount of current. That is, an amount of current that has the potential of damaging load 120 or at least temporally rendering load 120 inoperable. As one skilled in the art will recognize, the predetermined amount of current is dependent upon the type and characteristics of load 120, and switch controller 1330 may be variously configured to accommodate varying amounts of current.

Figure 2:
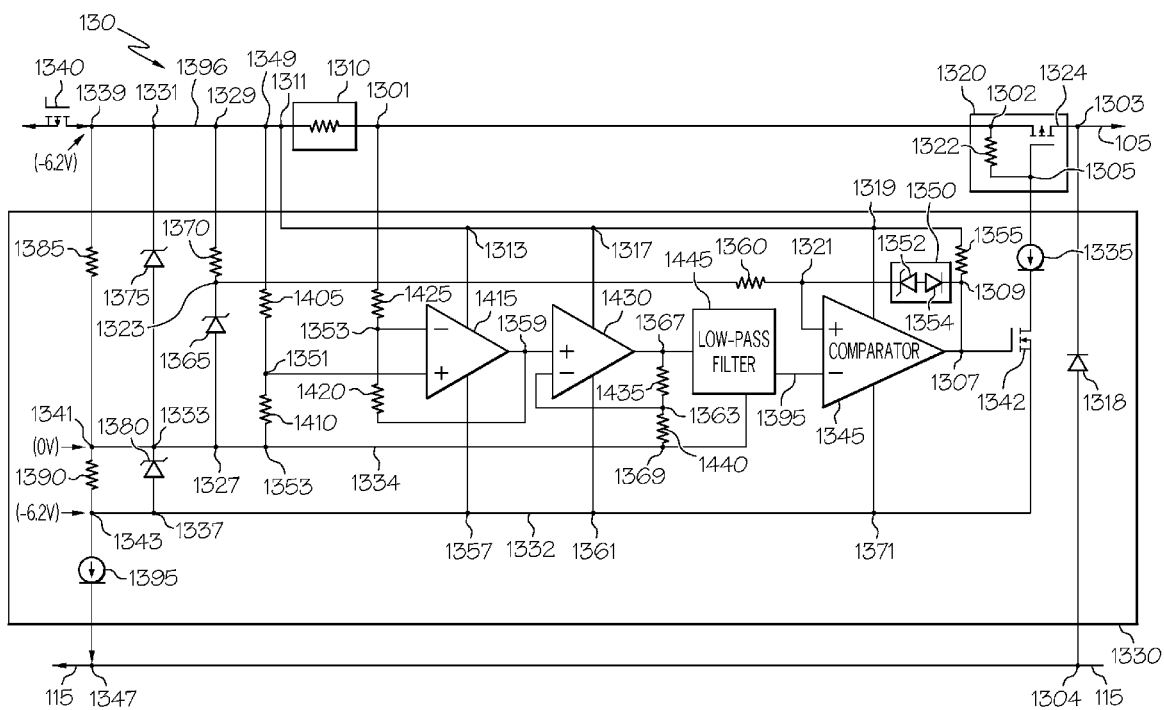
FIG. 2 is a schematic diagram of one embodiment of the electronic circuit breaker included in the system of FIG. 1.

FIG. 2 is a schematic diagram of one embodiment of electronic circuit breaker 130, which comprises current sensor 1310, switching element 1320, and switch control 1330. Current sensor 1310 may be any device capable of detecting the amount of current being supplied by power source 110. In the illustrated embodiment, current sensor 1310 is a resistive element (e.g., a resistor) providing 0.1Ω of resistance; however, other embodiments of electronic circuit breaker 130 may use a greater amount or a lesser amount of resistance in current sensor 1310 based on the amount of power being supplied to load 120 from power supply unit 110. Current sensor 1310 is coupled to switching element 1320 via nodes 1301 and 1302.

Switching element 1320 comprises a resistor 1322 coupled to a switch 1324. In the illustrated embodiment, resistor 1322 is a 10 kΩ resistor; however, resistor 1322 may include another amount of resistance depending on the amount of power being supplied to load 120 from power supply unit 110.

In the illustrated embodiment, switch 1324 is a P-channel metal oxide semiconductor field effect transistor (MOSFET). In another embodiments switch 1324 may be a P-channel junction field effect transistor (JFET) or bipolar transistor device such as a PNP transistor. As illustrated in FIG. 2, the drain of switch 1324 is coupled to a node 1303 that is coupled to load 120 (via power rail 105 (see FIG. 1)) and the cathode of a diode 1318 including an anode coupled to current return 115 at a node 1304. Furthermore, resistor 1322 is coupled to the source and the gate of switch 1324 via node 1302 and a node 1305, respectively.

Node 1305 is coupled to a current-limiting diode 1335 for limiting current and which is, at least in the illustrated embodiment, a 5 mA current-limiting diode. Other embodiments of electronic circuit breaker 130 may use a diode having a larger or smaller sized diode as a current-limiting device depending on the application of electronic circuit breaker 130. Diode 1335 is also coupled to a switch 1342.

In the illustrated embodiment, switch 1342 is an N-channel MOSFET. In another embodiments switch 1342 may be an N-channel JFET or bipolar transistor device such as a NPN transistor. The drain of switch 1342 is coupled to current-regulating diode 1335 and the source of switch 1342 is coupled to a negative voltage 1332 (e.g., −6.2 V relative to circuit voltage reference 1334). The gate of switch 1342 is coupled to a node 1307 that is coupled to an output terminal of a comparator 1345 and a node 1309. Node 1309 is also coupled to an anti-latch-up circuit 1350 and a resistor 1355 (e.g., a 10 kΩ resistor) that is coupled to power rail 105 via nodes 1311 (which is coupled to current sensor 1310), 1313, 1317, and 1319 (which is also coupled to comparator 1345 such that comparator 1345 receives power from power supply unit 110 (see FIG. 1)).

Anti-latch-up circuit 1350, at least in illustrated embodiment, is a 3.2 volt circuit that is configured to enable electronic circuit breaker 130 to be ON at start-up. That is, anti-latch-up circuit 1350 ensures that electronic circuit breaker 130 is operational upon power application from power supply unit 110, to power load 120 (see FIG. 1). In the illustrated embodiment, anti-latch-up circuit 1350 comprises a band gap reference 1352 coupled to a diode 1354. Specifically, band gap reference 1352 and diode 1354 are coupled to one another via their respective anodes, and the cathode of diode 1354 is coupled to node 1309. In the illustrated embodiment, band gap reference 1352 is a 2.5 volt band gap reference; however, other embodiments of band gap reference 1352 may include a greater voltage or a smaller voltage than 2.5 volts. The cathode of band gap reference 1352 is coupled to a node 1321 that is coupled to the positive terminal of comparator 1345 and a resistor 1360 (e.g., a 4.99 kΩ resistor) that is coupled to a node 1323.

Node 1323 is also coupled to a band gap reference 1365, which in the illustrated embodiment is a 1.2 volt band gap reference, and that is coupled to ground 1334 at a node 1327. Node 1323 is further coupled to a resistor 1370 (e.g., a 2 kΩ resistor) coupled to power rail 105 at a node 1329 that is also coupled to a node 1331.

Node 1331 is coupled to the cathode of a zener diode 1375 (e.g., a 6.2 volt zener diode) that includes an anode coupled to circuit voltage reference 1334 at a node 1333. Node 1333 is coupled to the cathode of a zener diode 1380 (e.g., a 6.2 volt zener diode) that includes an anode coupled to negative voltage 1332 at a node 1337. Node 1331 is further coupled to a node 1339. These connections develop a shunt-regulator bipolar-power supply of +/−6.2 volts centered about circuit voltage reference node 1334 upon application of voltage greater than about 12.4 volts from power-supply unit 110. Accordingly, during normal operation, node 1396 is +6.2 volts relative to circuit voltage reference node 1334, and node 1332 is −6.2 volts relative to circuit voltage reference node 1334. This bipolar power supply is utilized in electronic circuit breaker 130 to supply operating power to active components noted as amplifier 1415, amplifier 1430, low-pass filter 1445, comparator 1345, and switch 1342, as well as connecting and interconnecting device to these active components.

Node 1339 is coupled to switch 1342 (which is coupled to power supply unit 110 (see FIG. 1)). Switch 1342 at least in the illustrated embodiment, is a P-channel metal oxide semiconductor field effect transistor (MOSFET). In another embodiments switch 1324 may be a P-channel junction field effect transistor (JFET) or another type of switch device capable of electronically or manually switching ON/OFF electronic circuit breaker 130. Node 1339 is further coupled to a resistor 1385 (e.g., a 100 kΩ resistor that is coupled to circuit voltage reference 1334 at a node 1341.

Node 1341 is coupled to a resistor 1390 (e.g., a 2.49 kΩ resistor) that is coupled to negative voltage 1332 at a node 1343. Node 1343 is also coupled to a current-limiting diode 1395 that is coupled to current return 115 at a node 1347.

Current-limiting diode 1395 is, at least in the illustrated embodiment, a 35 mA diode. Furthermore, current-limiting diode 1395 is responsible for passing the shunt-regulator bipolar-power supply current, active component current, and interconnecting circuitry current, while limiting excessive current in electronic circuit breaker 130 when the voltage generated by power-supply unit 110 exceeds about 12.4 volts to reduce power consumption from power-supply unit 110. Other embodiments of electronic circuit breaker 130 may use a larger or smaller sized current-limiting diode 1395 depending on the application of electronic circuit breaker 130. Still other embodiments of electronic circuit breaker 130 may use a current-limiting device other than a current-limiting diode 1395 as a current-limiting device depending on the application of electronic circuit breaker 130.

With reference again to node 1329, node 1329 is further coupled to a node 1349 that is coupled to node 1311 and a resistor 1405 (e.g., a 10 kΩ resistor). Resistor 1405 is also coupled to a node 1351, which is coupled to a resistor 1410 (e.g., a 10 kΩ resistor) that is coupled to circuit voltage reference 1334 at a node 1353. Node 1351 is further coupled to an amplifier 1415 non-inverting input.

Amplifier 1415, at least in the illustrated embodiment, is an operational amplifier; however, various embodiments of electronic circuit breaker 130 contemplate the use other types of amplifiers for amplifier 1415. Amplifier 1415 is coupled to nominal +6.2 volts 1396 at node 1313 and receives power from power-supply unit 110 (see FIG. 1). Amplifier 1415 is additionally coupled to nominal −6.2 volts 1332 at node 1357 and receives power from power-supply unit 110. The positive terminal of amplifier 1415 is coupled to node 1351 and the negative terminal of amplifier 1415 is coupled to a node 1353 that is coupled to a resistor 1420 (e.g., a 10 kΩ resistor) and a resistor 1425 (e.g., a 10 kΩ resistor), which is coupled to node 1301. The output terminal of amplifier 1415 is coupled to a node 1359 that is coupled to resistor 1420 and the non-inverting terminal of an amplifier 1430.

Amplifier 1430, at least in the illustrated embodiment, is an operational amplifier; however, various embodiments of electronic circuit breaker 130 contemplate the use other types of amplifiers for amplifier 1430. Amplifier 1430 is coupled to nominal +6.2 volts 1396 at node 1317 and receives power from power-supply unit 110 (see FIG. 1). Amplifier 1430 is additionally coupled to nominal −6.2 volts 1332 at node 1361 and receives power from power-supply unit 110. The inverting terminal of amplifier 1430 is coupled to a node 1363 that is coupled to a resistor 1435 (e.g., a 2.49 kΩ resistor) and a resistor 1440 (e.g., a 1.0 kΩ resistor) that is coupled to ground 1334. The output terminal of amplifier 1430 is coupled to a node 1367 that is coupled to resistor 1435 and the input terminal of a low-pass filter 1445.

Low-pass filter 1445 is coupled to circuit voltage reference 1334 at node 1369 and the output of low-pass filter 1445 is coupled to the inverting terminal of comparator 1345. Low-pass filter 1445 may be any system and/or device that operates as a low-pass filter (e.g., and RC circuit).

Comparator 1345 is coupled to nominal +6.2 volts 1396 at node 1321 and receives power from power-supply unit 110 (see FIG. 1). Comparator 1345 is additionally coupled to nominal −6.2 volts 1332 at node 1371 and receives power from power-supply unit 110.

The following discussion may be helpful in understanding the operation of electronic circuit breaker 130. At start-up, electronic circuit breaker 130 receives power from power-supply unit 110 in an increasing fashion, beginning at zero volts and ending at, for example, 28 volts. As electronic circuit breaker 130 receives power from power-supply unit 110, voltage develops across 1396 and circuit voltage reference node 1332, beginning at 0 volts and ending at, for example, 6 volts, as well as voltage develops across node 1333 and voltage reference node 1332, beginning at 0 volts and ending at, for example, −6 volts. As will be evident from the following description, anti-latch-up circuit 1350 ensures that electronic circuit breaker 130 is guaranteed ON (i.e. supplying power to load 120) following start-up. Specifically, anti-latch-up circuit 1350 acts similar to a voltage switch in that when the voltage across node 1321 and node 1309 is less than, for example, 3.2 volts, anti-latch-up circuit 1350 prevents positive feedback application to comparator 1345 that would latch comparator 1345 to its output LOW state. In other words, during power-up, when the operation of comparator 1345 is not guaranteed (i.e., comparator 1345 is powered with voltage of less than, for example, 2 volts and node 1319 has less than +2 volts with respect to node 1371) comparator 1345 output may be HIGH or may be LOW. When the output of comparator 1345 is HIGH during power-up, the voltage at node 1307 is greater than the voltage required to switch ON N-channel MOSFET switch 1342 (i.e., switch 1342 will be ON, conducting current from drain to source). When switch 1342 is ON, switch 1324 of switching element 1320 is ON such that power is provided to load 120, which is the desired condition at start-up.

During power-up, when the operation of comparator 1345 is not guaranteed (i.e., comparator 1345 is powered with voltage between 0 volts and 2 volts), and comparator 1345 happens to be LOW, anti-latch-up circuit 1350 prevents the voltage at node 1307 from asserting latching positive feedback to node 1321 (i.e., node 1321 is pulled to a voltage below node 1395). Note that anti-latch-up circuit 1350 only allows latching positive feedback application to the non-inverting input of comparator 1345 when the voltage across anti-latch-up circuit 1350 exceeds the bandgap 1352 voltage (2.5 volts in this implementation) plus the voltage of diode 1354 (0.7 volts in this implementation), which equals 3.2 volts. Latching positive feedback can only be asserted when non-inverting comparator 1345 and node 1321, which are normally at 1.2 volts during power-up, is pulled below the voltage at inverting comparator 1415 and node 1359, which is normally at or above zero volts. This situation requires −3.2 volts at the output of comparator 1345, which requires at least 3.2 volts at node 1371 and means that comparator 1345 is powered by more than 2.0 volts and has sufficient power-supply voltage for guaranteed operation.

In addition, node 1321 receives a nominal 1.2 volt bandgap reference voltage from node 1323 and powers-up before low-pass filter 1445 and before the voltage at node 1395 rises due to a delay in low-pass filter 1445. Accordingly, during power-up and normal operation, the voltage at node 1321 exceeds the voltage at node 1395, and since node 1321 is at the non-inverting input of comparator 1345, and node 1395 is the inverting input to comparator 1345, the output of comparator 1345 will be guaranteed HIGH only when comparator 1345 is powered by at least 2 volts (i.e., node 1319 has at least +2 V with respect to node 1371). When the output of comparator 1345 is HIGH during start-up and normal operation, the voltage at node 1307 is greater than the voltage required to switch ON N-channel MOSFET switch 1342 (i.e., switch 1342 will be ON, conducting current from drain to source). When switch 1342 is ON, switch 1324 of switching element 1320 is ON such that power is provided to load 120, which is the desired situation at start-up.

In the situation when current sensor 1310 detects an amount of current greater than a predetermined threshold amount, the differential voltage across node 1311 and node 1301 is amplified by comparators 1415 and 1430. The amplified voltage is filtered by low-pass filter 1445, and the amplified voltage is input to the inverting input of comparator 1345. When the inverting input of comparator 1345 exceeds the voltage at the non-inverting input of comparator 1345, the output of comparator 1345 goes LOW, which causes switch 1342 to switch OFF. Switching switch 1342 OFF causes switch 1324 to switch OFF, which has the effect of an open circuit (i.e., prevents load 120 from receiving power).

Once electronic circuit breaker 130 has been "tripped," electronic circuit breaker 130 may be either electronically (e.g., via switch 1340) or manually switched back ON. In one embodiment, electronic circuit breaker 130 may be switched ON via switch 1340 after about 0.1 seconds, although other amounts of time may be used.

In the above description, various values are provided for resistors, diodes, voltages, power-supply unit 110, load 120, etc. These values are exemplary values and are not intended to limit the scope of the invention. That is, one skilled in the art will recognize that the power needed to operate different load applications will dictate the amount of power required to be supplied by power-supply unit 110, and different requirements may change the value/size of one or more components used in electronic circuit breaker 130 in such load applications.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The invention claimed is:

1. An electronic circuit breaker configured to isolate a load from a power-supply unit, comprising:
   a current sensor configured to be coupled to the power-supply unit;
   a first switch coupled to the current sensor and configured to be coupled to the load;
   a switch controller coupled to the current sensor and the first switch, the switch controller configured to be also coupled to and receive power from the power-supply unit and configured to switch OFF the first switch when the current sensor detects an amount of current from the power-supply unit greater than a predetermined amount, the switch controller comprising
   an anti-latch-up circuit, the anti-latch-up circuit including:
     a band gap reference including a first cathode and a first anode, and
     a diode including a second cathode and a second anode coupled in series with the first anode, the anti-latch-up circuit coupled to the power-supply unit and configured to enable the switch controller to maintain the first switch in an ON condition during start-up; and
   a comparator including:
     a first negative terminal,
     a first positive terminal coupled to the first cathode,
     a first output terminal coupled to the second cathode; and
   a second switch coupled to the first output terminal and configured to be coupled to the first switch.

2. The electronic circuit breaker of claim 1, wherein the first switch is a P-channel transistor and the second switch is an N-channel transistor.

3. The electronic circuit breaker of claim 2, further comprising a low-pass filter coupled to the first negative terminal.

4. The electronic circuit breaker of claim 3, wherein the switch controller further comprises:
   a first operational amplifier including a second negative terminal, a second output terminal coupled to the second negative terminal and the low-pass filter, and a second positive terminal; and
   a second operational amplifier including a third positive terminal configured to be coupled to the power-supply unit, a third output terminal coupled to the second positive terminal, and a third negative terminal coupled to the third output terminal and configured to be coupled to the current sensor.

5. The electronic circuit breaker of claim 1, wherein the switch controller further comprises a current-limiting diode coupled to the second switch and configured to be coupled to a current return coupled to the power-supply unit and the load.

6. An electronic circuit breaker configured to isolate a load from a power-supply unit, comprising:
   a current sensor configured to be coupled to the power-supply unit;
   a first switch coupled to the current sensor and configured to be coupled to the load, wherein the electronic circuit breaker is capable of being coupled to loads in the range of about 1.0 mA to about 1.0 kA or loads in the range of about 1.0 mV to about 1.2 kV;
   a switch controller coupled to the current sensor and the first switch, the switch controller configured to be also coupled to and receive power from the power-supply unit and configured to switch OFF the first switch when the current sensor detects an amount of current from the power-supply unit greater than a predetermined amount, the switch controller comprising
   an anti-latch-up circuit, the anti-latch-up circuit including:
     a band gap reference including a first cathode and a first anode, and
     a diode including a second cathode and a second anode coupled in series with the first anode, the anti-latch-up circuit coupled to the power-supply unit and configured to enable the switch controller to maintain the first switch in an ON condition during start-up; and
   a comparator including:
     a first negative terminal,
     a first positive terminal coupled to the first cathode,
     a first output terminal coupled to the second cathode; and
   a second switch coupled to the first output terminal and configured to be coupled to the first switch.

7. An electronic system, comprising:
   a power-supply unit;
   a load; and
   an electronic circuit breaker comprising:
     a current sensor coupled to the power-supply unit,
     a first switch coupled to the current sensor and the load, and
     a switch controller coupled to the power-supply unit, the current sensor, and the first switch,
     wherein the switch controller is powered by the power-supply unit and is configured to switch OFF the first switch when the current sensor detects an amount of current from the power-supply unit greater than a predetermined amount,
     wherein the switch controller comprises:
       an anti-latch-up circuit configured to be coupled to the power-supply unit, the anti-latch-up circuit configured to enable the switch controller to maintain the first switch in an ON condition during start-up,
       a second switch coupled to the first output terminal and the first switch, and
       a comparator including:
         a first negative terminal;
         a first positive terminal coupled to the anti-latch-up circuit; and a first output terminal coupled to the anti-latch-up circuit, the first output terminal coupled to the second switch.

8. The system of claim 7, wherein the load is in the range of about 1.0 mA to about 1.0 kA or in the range of about 1.0 mV to about 1.2 kV.

9. The electronic circuit breaker of claim 7, further comprising a low-pass filter coupled to the first negative terminal.

10. The electronic circuit breaker of claim 9, wherein the switch controller further comprises:

a first operational amplifier including a second negative terminal, a second output terminal coupled to the second negative terminal and the low-pass filter, and a second positive terminal; and a second operational amplifier including a third positive terminal coupled to the power-supply unit, a third output terminal coupled to the second positive terminal, and a third negative terminal coupled to the third output terminal and the current sensor.

11. The system of claim 6, further comprising a current return coupled to the electronic circuit breaker, the load, and the power-supply unit.

12. The system of claim 11, wherein the electronic circuit breaker further comprises:

a second switch coupled to the first switch; and a current-limiting diode coupled to the second switching element, the current return, and the power-supply unit.

* * * * *